Patented Aug. 7, 1934

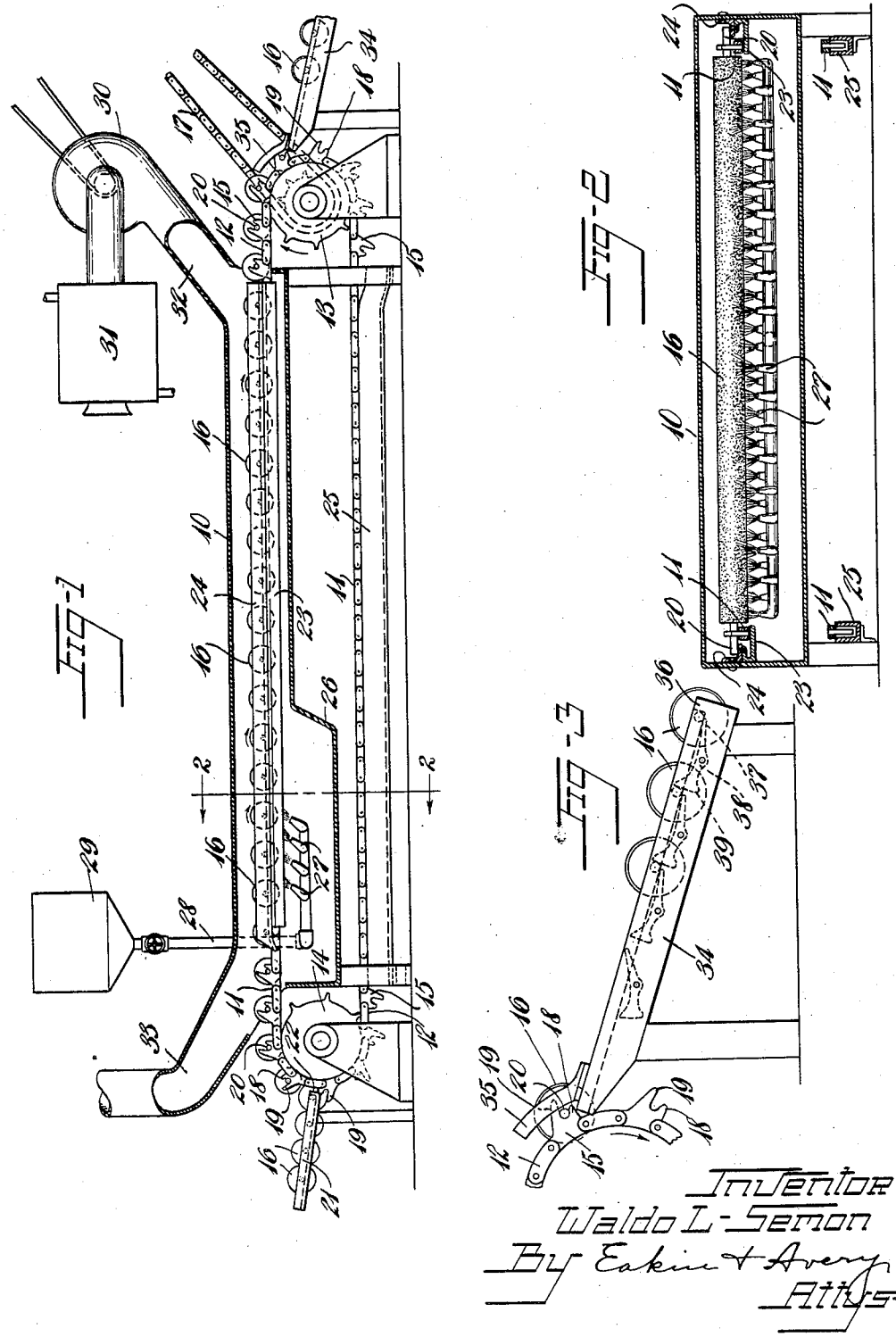

1,969,101

UNITED STATES PATENT OFFICE 1,969,101

MANUFACTURE OF RUBBER ARTICLES

Waldo L. Semon, Cuyahoga Falls, Ohio, assignor to The B. F. Goodrich Company, New York, N. Y., a corporation of New York Application April 18, 1929, Serial No. 356,227

14 Claims. (Cl. 18—15)

This invention relates to the art of manufacturing rubber, and particularly to the manufacture of a large number of similar or identical articles directly from latex by a continuous or semi-automatic process.

It is well known that the vigorous mastication which is a necessary incident to the manufacture of rubber or rubber articles by the traditional methods greatly degrades or even destroys the strength, elasticity and chemical stability of the rubber, and that these properties are only imperfectly restored during the vulcanization process.

It has therefore been proposed to manufacture rubber articles directly from rubber latex without mastication, depolymerization or similar destructive processes. The vulcanizing agents, accelerators, fillers and other conditioning or modifying agents are dispersed in water and added to the liquid latex, the rubber and such additional substances being separated from the water simultaneously. The separation of the rubber has been accomplished by electrodeposition on conducting forms, by coagulation on porous forms impregnated with a coagulant, and by dipping forms and drying successive thin layers thereon. Such methods, however, require very careful control of the properties of the latex and of the manufacturing operations and hence do not readily lend themselves to continuous quantity production.

This invention consists in manufacturing a continuous succession of similar articles by passing a series of forms over a bank of spray nozzles which spray thereon a layer of latex of the desired thickness. If it is desired to apply a heavy layer of rubber, the latex is partially dried during the spraying operation, or between two successive applications, in order that the rubber layer as it is built up may be self-supporting and free from all tendency to flow. The coated forms are passed through a drying chamber, in which the greater part of the remaining moisture is eliminated.

The invention will be readily understood by reference to the specific embodiments shown in the accompanying drawing.

Fig. 1 is a side view of a machine for the continuous manufacture of tubes, such as inner tubes for automobile tires, one wall of the machine being broken away to expose the interior.

Fig. 2 is a sectional view taken through the line 2, 2 of Fig. 1.

Fig. 3 is a view on an enlarged scale of the receiving rack shown at the right end of Fig. 1.

In Fig. 1, the body 10 of the machine has the form of a tunnel drier, through which passes a pair of chain conveyors 11, composed of alternate plain double links 12, 12, which engage the teeth of the drive sprockets 13 and the idler sprockets 14, and bifurcated single links 15, 15, which support and drive the tube mandrels 16, 16. The chains are driven at a slow but uniform rate of speed by any convenient means, for example by the chain 17 from an independent source of power.

The mandrels 16, 16, which may be made of any convenient material, such as aluminum, steel, stainless iron, or even wood, are cylindrical in shape, the length and diameter being chosen with reference to the size of tube which is being manufactured. They are provided with rigid axles 20, which are preferably small in diameter compared with the diameter of the mandrel, say one-tenth as large. The uncoated mandrels are supported by their axles in a loading rack 21, which is inclined toward the machine proper to permit the first mandrel to roll down against the stop 22 at the end of the loading rack.

The bifurcated links 15, 15 of the chain conveyor 11 are provided with short front arms 18 and long back arms 19, which are more clearly shown in the enlarged view of Fig. 3. As the chain revolves about the idler sprocket 14 of Fig. 1, the short front arms 18 of the links clear the axles 20 of the mandrels 16 in the loading rack 21, but the longer back arms 19 engage the axles and lift the first mandrel up out of the loading rack and carry it into the tunnel 10. Thereupon the succeeding mandrel in the loading rack rolls down against the stop 22 and is in its turn picked up by the next bifurcated conveyor link.

The conveyor chains 11, 11 are supported in their passage through the tunnel 10 by horizontal rails 23, 23, the position of which is clearly indicated in Fig. 2. Above these is a second pair of rails 24, 24, which lift the mandrels 16, 16 off the conveyor links 15 to such a height that the mandrels roll along the rails 24, 24, being driven by the long arms 19 of the bifurcated links 15. Because of the small diameter of the axles 20, the mandrels revolve several times about their axes during their progression forward a distance corresponding to one mandrel diameter. For example, if the ratio of mandrel diameter to axle diameter is 10 to 1, the mandrels will revolve $\frac{10}{\pi}$ or 3.18 times while they progress one diameter. The rate of revolution may be still further increased by decreasing the axle diameter. The chains returning underneath the tunnel may be supported if desired by U-shaped rails 25, 25.

The inlet end of the tunnel 10 in Fig. 1, is provided with an enlargement 26 beneath the conveyors 11 to accommodate a bank of sprays 27, 27, which are supplied with latex through a pipe 28 from a tank 29. The number of rows of sprays is such that the desired thickness of rubber is deposited on the mandrels during their passage over the sprays. Four rows are shown in the drawing, but either more or fewer may be employed. The spray nozzles in each row are preferably disposed close enough to one another that their spray cones overlap, and the nozzles of successive rows are preferably staggered to ensure uniformity of thickness of the deposited rubber. The nozzles are shown disposed at a considerable angle so that the spray of latex is never directed upward between two successive mandrels but is always intercepted by one of the mandrels.

The latex may be sprayed by pressure through ordinary spray nozzles, or it may be atomized by a rapid stream of air or other gas in atomizer nozzles. The type of nozzle employed will depend on the composition of the latex mixture, atomizer nozzles being preferred for use with mixtures which tend to clog ordinary nozzles.

A blower 30 draws air through an air conditioner 31, which simultaneously heats the air and regulates its humidity, and discharges the heated air through the conduit 32 into the discharge end of the tunnel 10. The air passing over the coated mandrels dries them thoroughly, a large part of the drying being accomplished during the actual spraying operation. The used air is vented to the atmosphere through the conduit 33.

The coated mandrels pass out of the tunnel 10 and approach the driving sprocket 13. As the conveyor in Fig. 3 passes over the sprocket, the mandrels 16 are dropped on the receiving rack 34. The curved guide bar 35 serves to retain the mandrels in their position in the slots of the bifurcated conveyor links 15 until they are immediately adjacent to the rack 34, when the termination of the bar 35 allows the mandrels to roll off the conveyor and down the receiving rack to the stop 36 at the lower end thereof. Each successive mandrel as it takes its place depresses the lower end 37 of a centrally pivoted spacing stop 38, the upper weighted end 39 of which rises and stops the next succeeding mandrel out of contact with the preceding one and therefore eliminates possible damage to the unvulcanized rubber. As each mandrel is removed from the rack, it releases the spacing stop 38, the heavy end 39 dropping back below the level of the rails of the receiving rack 34 and permitting the succeeding mandrel to roll down and take its place.

The operation of the machine is preferably so regulated that the latex is deposited on the mandrels in numerous thin layers, each of which is partially dried by the current of heated air passing over the rotating mandrels before the succeeding layer is applied. The drying of each layer should be just sufficient to render the rubber on the mandrel self-supporting and to eliminate all tendency to flow, but should not completely dry the rubber, since successive layers of rubber do not always adhere satisfactorily to dry latex rubber. The drying of the tubes is completed during their passage from the last row of sprays to the discharge end of the tunnel. The drying is usually most quickly accomplished if the humidity of the air is maintained comparatively high to prevent the formation of a skin of dry rubber which impedes the diffusion of moisture from underlying damp layers.

In some cases it may prove advantageous to coagulate the latex during the spraying operation, for example by spraying a coagulable latex mixture and a coagulant simultaneously on the mandrel or form in the manner described and claimed in the co-pending application of Zimmerli and Semon, Serial No. 310,434, filed October 4, 1928 which has become Patent 1,841,076. In this case it will not be necessary to dry the coating during deposition, since the rubber is rendered self-supporting by the coagulation.

The latex which is employed may be the ordinary latex of commerce, that is, the ammonia-preserved latex derived from the *Hevea brasiliensis* tree, or it may be the latex of other rubber trees, or even of gutta-percha or balata. It may be an artificial latex such as that prepared by dispersing solid rubber, rubber-like substances, or rubber derivatives in water, or may consist of mixtures of any such natural or artificial latices. The latex may contain pigments, fillers, coloring matter, softeners, vulcanizing agents, accelerators of vulcanization, etc., such substances preferably being dissolved or finely dispersed in an alkaline solution and intimately admixed with the latex prior to the spraying operation. If desired, the latex may even be vulcanized while in the liquid state, or may contain vulcanizing agents sufficiently powerful to effect vulcanization during drying. The latex is preferably of such a concentration that it is sufficiently fluid to be sprayed readily, but does not contain unnecessarily large proportions of water which would prolong the drying. A latex composition which is particularly valuable for the production of inner tubes for automobile tires is prepared, for example, by mixing the quantity of ammonia-preserved natural rubber latex containing 100 parts by weight of rubber with 3 parts of zinc oxide, 3 parts of sulphur, 0.3 parts of organic accelerator and 1 part of anti-oxidant. The added solids are dispersed in water, the dispersion mixed with the latex and the concentration of the mixture adjusted to about 50% of total solids. Rubber derived from this mixture may be vulcanized in 20 minutes at 275° F.

It is evident that the machine described above is capable of continuous automatic production of rubber tubes, requiring only a supply of latex in the tank 29, a supply of uncoated mandrels in the loading rack 21, and the removal of the coated mandrels from the receiving rack 33. The subsequent treatment of the tubes depends on the use to which they are to be put. If they are to become inner tubes, for example, they are vulcanized, stripped from the mandrel, provided with a valve stem, and spliced. If they are to be used for stationer' bands, they are vulcanized and cut into bands of the proper width.

A machine such as that described above may be employed for the production of tubes of almost any desired size or thickness by altering the dimensions of the mandrels and the dimensions and operation of the machine. Changes in diameter are effected by changing the diameter of the mandrels. Changes in length are effected by changing the length of the mandrels and the width of the bank of spray nozzles. Minor changes in thickness are effected by changing the intensity of the spray, or the rate of movement of the conveyor, and if necesary modifying the temperature or humidity of the drying air accordingly. Major changes in thickness are effected by changing the number of rows of spray nozzles in the spray bank.

It is obviously possible to adapt the method and apparatus of this invention to the continuous production of other shaped rubber articles than simple tubes. The necessary modifications of the conveyor and of the loading and receiving racks, etc., to accommodate the molds for such other articles, and the changes in the disposition of the spray nozlzes in any given case will be obvious to those skilled in the art.

It is to be understood that the term latex, as herein employed, is intended to include natural latices of caoutchouc, gutta-percha, balata, etc., as well as artificial latices or aqueous emulsions of caoutchouc, gutta-percha, balata, reclaimed rubber, synthetic rubber, rubber isomers and like products, whether or not admixed with vulcanizing agents, pigments, fillers, etc., or previously purified, concentrated, vulcanized or otherwise treated.

Inasmuch as numerous embodiments of this invention may be made without exceeding the scope thereof, it is not intended to limit this invention to the specific embodiment hereinabove described except as indicated in the appended claims.

I claim:

1. The method of manufacturing shaped rubber articles which comprises passing a continuous succession of forms past a group of spray nozzles, and spraying a plurality of coats of latex thereon, each coat being partially dried prior to the application of the subsequent coat.

2. The method of manufacturing rubber tubes which comprises passing a continuous succession of rotating cylindrical mandrels past a group of spray nozzles, and spraying a plurality of coats of latex thereon, each coat being partially dried prior to the application of the subsequent coat.

3. In a machine for the continuous manufacture of shaped rubber articles, the combination of a series of forms, means for moving the forms in continuous succession in a predetermined path, means adjacent to the said path adapted to spray successive coats of latex on the forms, and means adapted to dry the latex partially during the spraying operation and subsequently to complete the drying.

4. A machine for the continuous manufacture of rubber tubes comprising a series of cylindrical mandrels, means for moving the mandrels in continuous succession in a predetermined path, means for rotating the mandrels, a group of spray nozzles adapted to spray successive coats of latex on the surface of the mandrels, and a dryer adapted to dry the latex partially during the spraying operation and subsequently to complete the drying.

5. A machine for the continuous manufacture of rubber tubes comprising a series of cylindrical mandrels, a conveyor adapted to carry a continuous succession of the mandrels, means for rotating the mandrels, a plurality of groups of spray nozzles adapted to spray successive coats of latex uniformly over the length of the mandrels, and a dryer adapted to dry the latex partially during the spraying operation.

6. A machine for the continuous manufacture of rubber tubes comprising a tunnel type dryer, an endless chain conveyor passing therethrough, a series of cylindrical mandrels carried by the conveyor, means for delivering the mandrels to the conveyor at one point in its path and removing the mandrels at another point, means for rotating the mandrels, and a group of spray nozzles located within the confines of the dryer and adapted to spray latex on the surface of the mandrels.

7. A machine for the continuous manufacture of rubber tubes comprising a plurality of cylindrical mandrels terminating in supporting axles of relatively small diameter, a tunnel type dryer, a pair of horizontal rails therein, said rails being adapted to receive the supporting axles of the mandrels, means for causing the mandrels to roll slowly along the rails, and a group of spray nozzles within the dryer adapted to spray latex on the surface of the mandrels.

8. A machine for the continuous manufacture of rubber tubes comprising a plurality of cylindrical mandrels terminating in supporting axles of relatively small diameter, a tunnel type dryer, a pair of horizontal rails therein, said rails being adapted to receive the supporting axles of the mandrels, means for causing the mandrels to roll slowly along the rails, and a plurality of groups of spray nozzles within the dryer adapted to spray successive coats of latex on the surface of the mandrels.

9. A machine for the continuous manufacture of rubber tubes comprising a plurality of cylindrical mandrels terminating in supporting axles of relatively small diameter, a tunnel type dryer, means for supplying heated, humidified air to the dryer, a pair of horizontal rails within the dryer, said rails being adapted to receive the supporting axles of the mandrels, means for supplying a continuous succession of closely spaced mandrels to the rails, means for causing the mandrels to roll slowly along the rails, a plurality of groups of spray nozzles within the dryer adapted to spray successive coats of latex on the surface of the mandrels, and means for receiving the coated mandrels.

10. The method of manufacturing shaped rubber articles which comprises repeatedly applying a film of latex to the surface of a form, drying each film just enough to render it self-supporting before applying the succeeding coating, and finally completing the drying of the shaped article on the form.

11. The method of manufacturing shaped rubber articles which comprises repeatedly applying a film of latex to the surface of a form, rotating the form to maintain a uniform distribution of the latex on the surface of the form, drying each film just enough to render it self-supporting before applying the succeeding coating, and finally completing the drying of the shaped article on the form and vulcanizing the rubber.

12. The method of manufacturing shaped rubber articles which comprises successively applying a film of latex to each of a continuous series of forms, partially drying the latex on the forms to render it self-supporting, applying a second film of latex to each form, and finally completing the drying of the shaped articles on the forms.

13. The method of manufacturing rubber tubes which comprises rotating a cylindrical mandrel, applying a film of latex to the rotating mandrel, partially drying the latex until it has just become self-supporting, applying and partially drying other layers of latex on the mandrel, and finally completing the drying of the tubular rubber structure.

14. The method of manufacturing rubber tubes which comprises moving a continuous series of rotating cylindrical mandrels in a direction perpendicular to their axes, applying a plurality of coats of latex to each rotating mandrel in turn, partially drying each coat to render it self-supporting before the subsequent coat is applied, and finally completing the drying of the tubular rubber structure.

WALDO L. SEMON.